United States Patent

[11] 3,599,700

| [72] | Inventors | Adolfo O. Cutillo<br>Brecksville;<br>Joe A. Gourley, Jr., Akron; Ray A. Orlando, Alliance, all of, Ohio |
|---|---|---|
| [21] | Appl No | 44,504 |
| [22] | Filed | June 8, 1970 |
| [45] | Patented | Aug. 17, 1971 |
| [73] | Assignee | The General Tire & Rubber Company |

[54] SUSPENDABLE MOUNT TUBE
12 Claims, 4 Drawing Figs.

[52] U.S. Cl. .................................................. 157/1.21
[51] Int. Cl. .................................................. B60c 25/12
[50] Field of Search .................................... 157/1.21; 152/350

[56] References Cited
UNITED STATES PATENTS

| 2,712,339 | 7/1955 | Hurt | 152/350 |
| 2,766,006 | 10/1956 | Kraft | 157/1.21 X |
| 2,873,796 | 2/1959 | Riley | 157/1.21 |
| 3,343,583 | 9/1967 | Piunk | 157/1.21 |

*Primary Examiner*—Granville Y. Custer, Jr.
*Attorneys*—Frank C. Rote, Jr. and Harry F. Pepper, Jr.

ABSTRACT: An inflatable, ringlike, elastomeric diaphragm, or mount tube, used to spread pneumatic tire casings to facilitate mounting of the casing on rims, or to otherwise gain access to the interior of the casing, is provided with means for securing support loops or rings to the tube in the event the tube is to be handled and used while suspended. Such means are preferably a plurality of elastomeric pads cured to the exterior of the tube in the vicinity of the upper side or marginal portion thereof. The strips are each provided with a pair of openings through which a support or suspensory loop or ring may be passed. A suitable substance is placed between the exterior of the tube and a portion of the inner surface of the pad which includes the openings to prevent curing of that portion to the tube so as to allow passage of a support or suspensory loop therethrough.

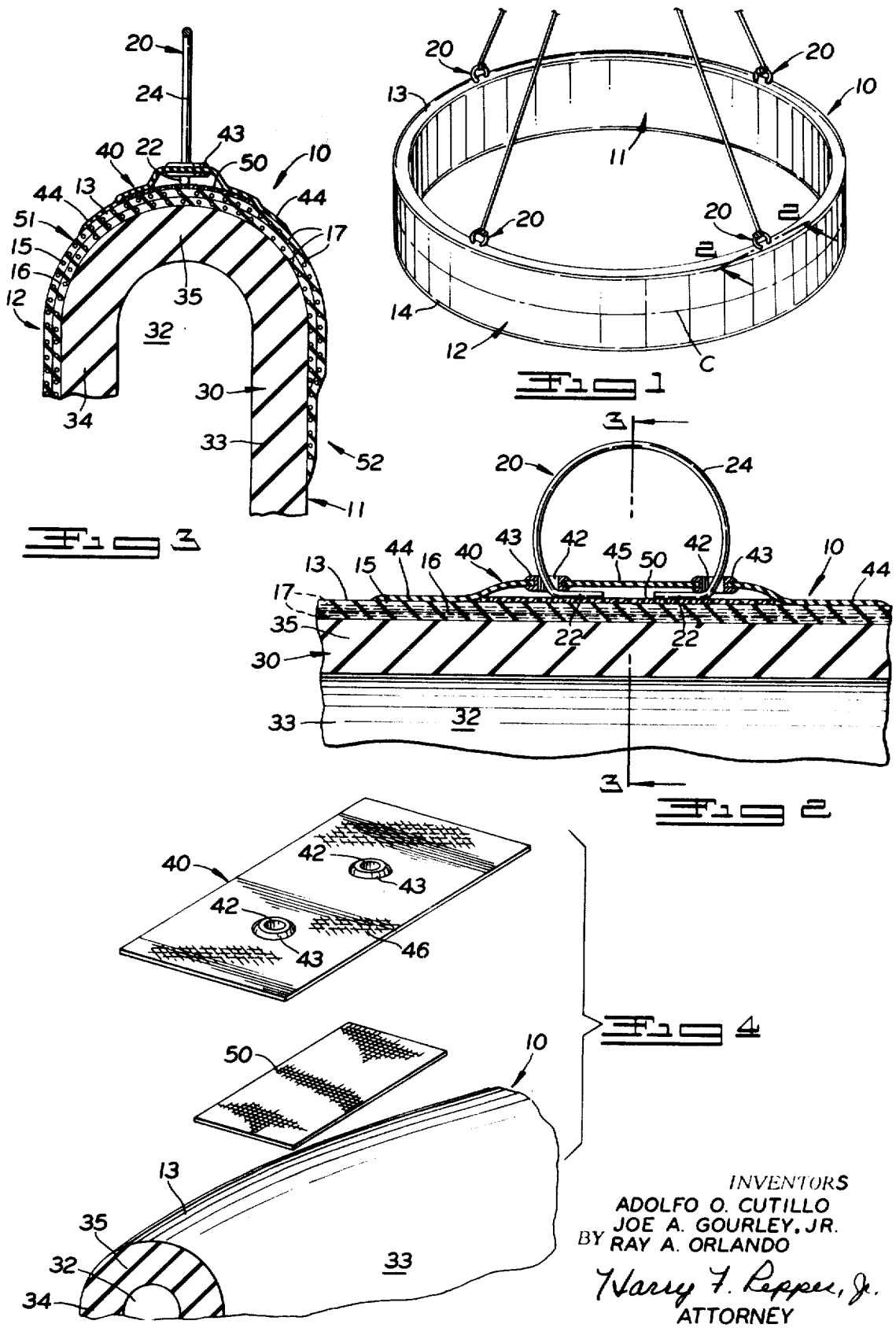

SUSPENDABLE MOUNT TUBE

BACKGROUND OF THE INVENTION

This invention relates to a diaphragm bead spreader or mount tube generally of the type described in U.S. Pat. No. 2,766,006 and U.S. patent application, Ser. No. 873,876 filed Nov. 4 1969, both assigned to the present assignee, and in particular, relates to improvements in such diaphragms.

Articles of the type described in the aforementioned patent and application are widely used for purposes of facilitating the somewhat difficult task of mounting tubeless tire casings on a suitable rim in order that the casing may be inflated on the rim. When casing are fitted with rims, the bead portions of the casings must be spread toward the spaced flanges of the rims before the tire can be inflated. Mount tubes of the type to which the invention relates are used to spread the bead portions of such casings.

THe operational and structural details of mount tubes are fully discussed in the aforementioned patent and application. Basically, the ringlike tubular mount tubes includes an airtight fluid chamber enclosed by a radially inner, flexible or extensible wall and a radially outer, substantially inextensible wall or restrained wall, said walls integrally joined by a pair of axially, spaced inextensible marginal walls. When the mount tube is inflated, only the radially inner wall extends. If a pneumatic tire casing is placed within the amount tube such that the radially inner wall, when extended, will forcibly engage the tread portion of the casing, the stiff, closely spaced, bead portions of the casings will spread apart.

In certain locations where these tubes are used, it is found advantageous to provide for suspension of such mount tubes. Suspended mount tubes are more easily manipulated and, in some cases, safer than tubes which are not suspended. The tubes are sometimes suspended by means of a heavy, annular, metal ring, which holds the tube against the inner surface thereof. The metal ring is suspended by chains or other suitable means usually from an overhead reel. Mount tubes can also be suspended by support loops made integral with the tube, thereby omitting the necessity for the heavy, annular, metal ring described previously.

For an example, of this latter type of suspendible mount tube, reference is directed to U.S. patent application, Ser. No. 32,798, filed Apr. 29, 1970, also assigned to the present assignee. In this application, it is suggested that rubber coated cords or cables can be formed into loops with the ends anchored and cured within the radially outer inextensible wall of the tube. While this type of structure has obviated the necessity of a heavy metal support ring as previously described, it has has some undesirable effects upon production of mount tubes, because of the additional and more detailed assembling steps necessary. Also, certain undesirable characteristics have been noted during operation of tubes designed in accordance with the specific embodiment disclosed in the last mentioned application. Rubber coated cords can, after a period of time, become worn, frayed or even broken.

Such worn, frayed or broken cords cannot be changed or replaced, because of the manner in which they are anchored to the tube. Further, the semirigid or flexible nature of the cable or cord-type loops make attaching and detaching to a principal or main suspensory support somewhat difficult.

SUMMARY OF THE INVENTION

It is an object of the present invention to provide inflatable diaphragms or mount tubes structurally adapted for suspension.

It is another object of the present invention to provide inflatable diaphragms or mount tubes of the type described with structurally simple means to which an be attached support or suspensory loops or rings.

It is another object of the present invention to provide a mount tube suspendible which is provided with a suspensory means built into, or made an integral part of, the tube.

It is a further object of the present invention to provide a mount tube provided with suspensory loops or rings secured to the mount tube, said rings being durable, changeable or replaceable, and easily attachable and detachable in relation to a primary suspensory support.

It is a further object of the present invention to provide a ringlike, inflatable, mount tube complete with means integral therewith which adapts the tube for vertical suspension where such means are more easily made part of the tube structure.

The mount tube according to the present invention preferably includes a plurality of elastomeric pads cured or vulcanized to the mount tube, spaced equidistantly, or according to some other predetermined arrangement, along the exterior surface thereof and in the vicinity of the upper, marginal wall area. Each pad is provided with at least a pair of ring or loop receiving opening through a portion thereof which is not cured to the exterior of the mount tube. A support or suspensory loop or ring may be thereafter attached to the tube by inserting the same between the pad and the tube exterior through the openings. Thus, the ring or loop is secured to the tube but remains structurally independent thereof. The elastomeric pad preferably contains fiber reinforcement such as nylon monofilaments. Specifically, pads made from material such as that used for pneumatic tire chafer strips are found highly satisfactory.

BRIEF DESCRIPTION OF THE DRAWINGS

FIG. 1 represents a mount tube constructed according to the present invention as it might appear suspended, with certain parts of the suspension system being omitted.

FIG. 2 is an enlarged partial sectional view along the lines 2–2 FIG. 1.

FIG. 3 is a view in section taken along the lines 3–3 of FIG. 2.

FIG. 4 is a general perspective view of a portion of the upper side of the mount tube according to the present invention showing a schematic separation of several of the key structural components.

DETAILED DESCRIPTION OF A PREFERRED EMBODIMENT

In FIG. 1, a ringlike diaphragm bead spreader, or mount tube 10 is illustrated in a suspended state by a plurality of support or suspensory rings 20, spaced equidistantly around the tube. The mount tube 10 inclines a radially inner flexible surface generally indicated 11 and a radially outer inextensible or restrained surface 12 joined by upper and lower axially space annular marginal surfaces 13 and 14, respectively. The diaphragm 10 has an annular or ringlike contour and is made in a range of sizes with the inner diameter thereof being such that in a selected size, the mount tube will fit about the periphery of a number of tire sizes.

Referring to FIGS. 2 and 3 the mount tube 10 includes a main core or body member which is shown as an elastomeric tube or bladder 30 which defines an airtight inner cavity 32. MOre specifically, the airtight inner cavity 32 is defined by a radially inner wall 33 and a radially outer wall 34, which are integrally joined by axially spaced annular marginal walls, upper wall 35 and a lower wall (not shown). The outer exterior of walls 33, 34 and 35 are the surfaces 11, 12 and 13 as seen in FIG. 1. The lower wall (not shown) forms surface 14 along its exterior. A valve fitting (not shown) normally registers with cavity 32 through the radially outer wall 12 of the tube 30. The mount tube is inflatable through such a valve fitting. The mount tube is constructed so that only the radially inner wall 33 extends upon inflation. The core tube or bladder 30 is made of a typical elastomeric compound with air retention properties, similar to those compounds used in the manufacture of tire inner tubes and the like. The respective thicknesses of outer wall 34 and inner wall 33 are parameters dependent on situations in which the tube 10 is to be used. The inner and outer walls 33 and 34, respectively, are shown equal in thickness; however, they may differ in thickness if desired. THe radially outer wall 34 of the tube 10 differs from the inner wall 11 in that it includes, in addition to the radially outer portion of core tube 30, restraining layer or band 51 composed of a pair of cord reinforced, elastomeric plies 15 and 16. The plies 15 and 16 coextend annularly with the outer wall 34, with the inner ply 16 being shown slightly wider than outer ply 15, but as seen in FIG. 3 with both plies extending around the axially spaced marginal walls (shown only around upper marginal wall 36). However, it is possible to provide that plies 15 and 16 be of equal width or that outer ply 15 be wider than inner ply 16. The plies terminate inwardly of each marginal wall as indicated at 52 in FIG. 3, somewhere along the spaced upper and lower portions of the surface 11 of the inner wall 33.

The plies 15 and 16 are composed of a suitable elastomeric compound reinforced by spaced, mutually parallel cords 17. Plies 15 and 16 are essentially similar to bias ply stock used in pneumatic tire construction. The cords 17 may be any of the suitable "textile-type" materials normally used as tire ply cords, such as cotton, rayon, polyester or glass. Nylon is preferably not used because of its tendency to shrink and grow under extreme changes in temperature. This tendency could have an adverse effect on the dimensions of the tube 10 which desirably should remain substantially constant. Metal cables or wires are also suitable materials for the cords 17. The cords 17 are preferably disposed to lie at an acute angle relative to the circumferential centerline of the mount tube 10 indicated generally as the line C in FIG. 1. Also, for purposes of balance, the cords 17 in ply 16 will extend in an opposite direction relative to the direction of cords 17 in ply 15. In other words, the cords in a given ply such as 16 are to cross the cords in an adjacent ply such as 15. The construction specifically shows the restraining layer 51 composed of two plies; however, any number of plies may be used. When using additional plies, it is preferred that the number used is an even number for purposes of balance. The inner surface may be covered by a cord reinforced elastomeric ply of the type described and claimed in the aforementioned U.S. patent application, Ser. No. 873,876. However, for the sake of simplicity, a showing of such an additional ply along the inner wall 33 is omitted. As stated previously, inflation fluid enters through the valve stem or fitting (not shown) extending only the radially inner all 33 inwardly for engagement with the tread portion of a pneumatic tire casing placed within the mount tube 10. This action spreads the bead portion of the tire in a manner more fully explained in the aforementioned U.S. Pat. No. 2,766,006 and U.S. patent application, Ser. No. 873,876.

The above details relating to the basic structure of the mount tube are conventional and for purposes of the instant invention includes the details mentioned and in addition, any fair equivalents thereof as, for example, those described and suggested in the patent and application mentioned first above.

In accordance with the instant invention the tube 10 is shown provided with a plurality of support or suspensory loops or rings 20 which are equally spaced along the exterior of the tube, and more specifically, along the exterior surface 13 of the upper marginal wall 35. As seen in FIGS. 2 and 3, each loop 20 is held relative to the surface 13 of the upper annular marginal wall 35 by means of an elastomeric pad 40 cured or vulcanized thereto. The loops or rings 20 preferably include split, flattened portions 22 and a continuous portion 24.

Continuous portion 24 an be circular as shown or some other shape, such as triangular. As seen, the rings, because of the split design easily secured or removed from the tube.

The elastomeric pad 40 includes a pair of spaced openings 42 for registering or the passage therethrough of the flat split portions 22 of the ring 20. The openings 42 may or may not be reinforced with grommets 43, as desired. As seen in FIGS. 2 and 3, only the marginal areas 44 of the strip 40 are cured to the exterior of the wall 35, the central portion 45 being free therefrom. In other words, curing of the central portion 45, which includes the openings 42 to the tube is prevented. This is accomplished by providing a layer of material 50 suit able for such purposes between the underside of pad 40 and the surface 13. When placing the pad 40 onto the tube 10, the layer of adhesion preventing material 50 is properly placed against the inner face of the portion 45 containing openings 42. The Adhesion preventing material may be any material suitable for such purposes, such as a piece of Holland cloth.

The elastomeric strip 40 is strengthened or reinforced by fibrous material 46 such as, for example, nylon monofilaments. Pneumatic tire chafer strip stock used in pneumatic tire constructions has been found highly suited for such use.

To assemble the improved mount tube according to the present invention the diaphragm or tube per se is assembled in a typical manner such as generally discussed or suggested in the aforementioned U.S. Pat. No. 2,766,006. While the tube is in an uncured or "green" state, the plurality of pads 40 of nylon filament reinforced elastomeric material is adhered to the exterior surface 13 of the upper annular marginal wall 35. Each pad 40 is applied along with a strip of material 50 in proper position relative to the inner surface of the strip 40 to prevent curing of the portion 45 of each strip 40 to the surface 13.

The tube is then cured, or vulcanized according to conventional techniques. After curing, the strips 40 are integral with the tube 10 except for that portion 45 protected by the strip of material 50. Suspensory loop or rings such as 20 may then be inserted through the openings 42 in the pads 40 and thereby secured to the tube while remaining structurally independent thereof.

The tube 10 is shown in FIG. 1 having four support or suspensory loops or rings 20, but more may be used if desired. It is preferred that at least three support rings be spaced equidistantly around the annular periphery of the tube 10. Also, while FIG. 1 shows rings 20 spaced substantially equidistantly, it is understood that rings or loops, such as 20, may be positioned according to any predetermined arrangement which might be more convenient.

It has been stated that the reinforcing or restraining plies 15 and 16 may include conventional cord-type reinforcing including wire cables. Best results have been obtained, however, when each of the restraining plies 15 and 16 include glass cord reinforcement. The glass cords are strong enough to hold the tube in a substantially circular form when suspended. While wire cables also offer this advantage, wire can add additional, and sometimes undesirable, weight. Other textile-type reinforcing cords, such as rayon or polyester, while suitable, tend to permit the tube to take a somewhat elliptical shape when suspended.

The suspensory loops or rings 20 are preferably constructed of metal. It is also possible that the loops 20 be made of other suitable substantially rigid, materials, such as plastic or hard rubber. The principal considerations in selecting the ring or loop material should be durability and adaptability for attachment and detachment from the principal or main supporting members such as chains, ropes or the like. Also, in the foregoing description a plurality of elastomeric strips 40 are described. However, it is possible that a single annular strip of fiber reinforced elastomeric stock could coextend with the upper marginal wall 35, in which would he provided a plurality of pairs of openings. Thus, each support loop or ring 20 could be passed through each of these pairs of openings.

While the foregoing relates to a mount tube constructed according to preferred embodiments, it is, of course , possible to depart from the specific details shown by various modifications which become obvious from the foregoing description. FOr example, the exact positioning of the loops or rings 20 might be altered somewhat such that while remaining in the vicinity of the upper marginal wall 35 the loops would actually be extending form the radially outer inextensible surface 12. Many modifications, of course, can be made to the specific structure of the mount tube 10 as it is disclosed herein without departing from the inventive concept since these details of the tube are not critical. Thus, the invention as herein described is to be measured by the scope of the appended claims.

What we claim is:

1. In an inflatable, ringlike elastomeric diaphragm adapted to forcibly engage the outer periphery of a pneumatic tire casing, said diaphragm having an annular fluid chamber defined by a radially outer, substantially inextensible, annular wall and a radially inner, extensible, annular wall integrally joined to said outer wall by a pair of axially spaced, upper and lower substantially inextensible, marginal walls, the improvement comprising
   a. an elastomeric pad cured to the exterior of said diaphragm in the vicinity of said upper, marginal wall, said pad adapted to hold a support loop structurally independent of said diaphragm, such that said diaphragm may be suspended.

2. The invention as defined in claim 1 wherein said improvement is further characterized in that a plurality of said elastomeric pads defined in A) are cured to the exterior of said diaphragm at mutually equidistant locations in the vicinity of said upper marginal wall.

3. The improvement as defined in claim 1 wherein said elastomeric pad includes at least a pair of openings for passage therethrough of a portion of said support loop.

4. The improvement as defined in claim 3 wherein an adhesion preventative material is disposed between the exterior of said diaphragm surface of said pad adjacent thereto which includes said pair of spaced openings.

5. The improvement as defined in claim 2 wherein each of said pads include at least a pair of openings for passage therethrough of a portion of a support loop.

6. The improvement as defined in claim 2 wherein an adhesion preventative material is disposed between exterior of said diaphragm and a portion of the inner surface of each of said pads which includes said pair of spaced openings.

7. In an inflatable, ringlike elastomeric diaphragm adapted to forcibly engage the outer periphery of a pneumatic tire casing, said diaphragm having an annular fluid chamber defined by a radially outer, substantially inextensible, annular wall and a radially inner, extensible annular wall integrally joined to said outer wall by a pair of axially spaced, upper and lower, substantially inextensible, marginal walls, the improvement comprising
   1. an elastomeric pad cured to the exterior of said diaphragm in the vicinity of said upper, annular marginal wall, and
   2. a suspensory loop supported by said elastomeric pad structurally independent of said diaphragm.

8. The improvement as defined in claim 7 further characterized in that a plurality of said elastomeric pads are cured at mutually equidistant locations along said upper, annular marginal wall.

9. The improvement as defined in claim 7 wherein said elastomeric pad includes at least a pair of openings for passage therethrough of a portion of said suspensory loop.

10. The improvement as defined in claim 9 wherein an adhesion preventive material is disposed between the upper annular marginal wall of said diaphragm and a portion of the inner surface of said pad which includes said pair of spaced openings.

11. The improvement as defined in Claim 8 wherein each of said pads includes at least a pair of openings for passage therethrough of a portion of said suspensory loop.

12. The improvement as defined in Claim 8 wherein an adhesion preventive material is disposed between the upper annular marginal wall of said diaphragm and a portion of the inner surface of each said pads which includes said pair of spaced openings.

PO-1050
(5/69)

UNITED STATES PATENT OFFICE
CERTIFICATE OF CORRECTION

Patent No. 3,599,700          Dated August 17, 1971

Inventor(s) Cutillo et al

It is certified that error appears in the above-identified patent and that said Letters Patent are hereby corrected as shown below:

Column 1, line 6, the phrase "This invention" should read -- The invention --; line 16, the word "casing" should read -- casings --; line 23, the word "tubes" should read -- tube --; line 25, the phrase "inextensible wall or restrained" should read -- inextensible or restrained --; line 29, the word "amount" should read -- mount --; line 53, the phrase "has has some" should read -- has had some --; line 73, the word "an" should read -- can --. Column 2, line 20, the word "opening" should read -- openings --; line 50, the word "inclines" should read -- includes --; line 50, the phrase "inner flexible surface" should read -- inner flexible or extensible surface --. Column 3, line 12, the phrase "marginal wall 36" should read -- marginal wall 35 --; line 47, the word "all" should read -- wall --; line 68, the word "an" should read -- can --; line 70, the phrase "the split design easily" should read -- the split design are easily --. Column 4, line 30, the word "loop" should read -- loops --, line 37, the phrase "around the annular" should read -- around the upper annular --; line 64, the word "he" should read -- be --; line 74, the word "form" should read -- from --. Column 5, line 28, the phrase "said diaphragm surface" should read -- said diaphragm and a portion of the inner surface --.

Signed and sealed this 21st day of March 1972.

(SEAL)
Attest:

EDWARD M. FLETCHER, JR.
Attesting Officer

ROBERT GOTTSCHALK
Commissioner of Patents